United States Patent Office 3,444,300
Patented May 13, 1969

3,444,300
N-POLYHALOALKYLTHIO COMPOUNDS AS FUNGICIDAL AGENTS
Gustave K. Kohn, Berkeley, Calif., assignor to Chevron Research Company, a corporation of Delaware
No Drawing. Original application May 5, 1964, Ser. No. 365,146, now Patent No. 3,178,447, dated Apr. 13, 1965. Divided and this application Dec. 1, 1964, Ser. No. 415,193
The portion of the term of the patent subsequent to Apr. 13, 1982, has been disclaimed
Int. Cl. A01n 9/12
U.S. Cl. 424—273     20 Claims This application is a division of copending application Ser. No. 365,146, filed May 5, 1964, now U.S. Patent 3,178,447 which in turn is a continuation-in-part abandoned applications Ser. Nos. 52,018, filed Aug. 26, 1960; 83,946, filed Jan. 23, 1961; 95,471, filed Mar. 14, 1961; 121,846, filed July 5, 1961; and 285,566 filed June 5, 1963.

This invention concerns N-polyhaloethylthio compounds and their use as biocides. More particularly, this invention concerns N-polyhaloethylthio compounds, in which the nitrogen is bonded to at least 1 acyl group, and their use as biocides, particularly fungicides.

Parasiticidal compounds containing the $>NSCCl_3$ group are commercially available and described in U.S. Patent Nos. 2,553,770 and 2,553,775. These compounds represent relatively potent parasiticidal compositions, and efforts at improvement upon them have heretofore been eminently unsuccessful. Obvious homologs of the above functionality, $>N-S-CCl_3$, e.g., 1,2-dichloroethyl, have proved of considerably less biological activity than the trichloromethyl compounds. Accordingly, adding an alkyl group, such as a methyl group, to the perchloromethyl radical in place of a chlorine resulted in a compound having very poor fungitoxic activity. Likewise, injecting a similar alkylene group between the sulfur and the trichloromethyl radical resulted in compounds of greatly diminished fungitoxic activity.

All efforts at increasing the length of the carbon chain attached to the sulfur, as above described, tended to diminish, if not entirely destroy, the fungicidal activity of the compounds. Biological screening of the homologous compounds obtained in this manner showed that the trichloromethyl compounds were by far the outstanding fungicides.

Contrary to the expectations based on the screening of these homologs, a unique class of compounds has been developed which possesses an extremely high level of fungitoxicity for many types of fungi, often greatly in excess of the standards established by the prior art fungicides indicated above. These compounds are N-polyhaloethylthio compounds wherein the nitrogen is attached to at least 1 acyl group (non-oxo-carbonyl and sulfonyl) and wherein the polyhaloethyl group has from 3 to 5 halogens, either chlorine or bromine, and at least 1 of the halogens is alpha to the sulfur. The N-polyhaloethylthio group has the following formula:

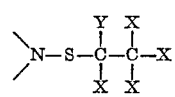

wherein S is sulfur, Y is either chlorine or bromine and X is either hydrogen, chlorine or bromine, but at least 2 X's are chlorine or bromine, i.e., halogen of atomic number 17 through 35.

The remaining two valences of the nitrogen are either bonded to a divalent radical which forms a ring with the nitrogen or to two monovalent radicals. The compounds which have a divalent organic group which forms a ring with the nitrogen have the following generic formula:

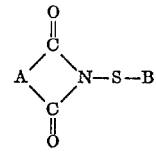

wherein B is the polyhaloethyl group indicated above and A is one of the following divalent groups:
(1) 1,2-carbocyclic group of 3 to 8 annular members, both saturated and olefinically unsaturated (including aromatic unsaturation in the six membered ring);

(2)                         $R_2\overset{|}{C}-NH-$ wherein R is either hydrogen or lower alkyl;
(3) $(CH_2)_n$, wherein $n$ varies from 2 to 3, i.e., dimethylene and trimethylene;
(4) $-CH=CH-$; and
(5) $-CH_2OCH_2-$ A preferably varies from 1 to 8 carbons and has from 0 to 1 heteroatom, either oxygen or nitrogen (atomic number 7 to 8).

The compounds which have 2 monovalent radicals have the following formula:

$$R^1SO_2\overset{R^2}{\underset{|}{N}}-S-B$$

wherein B is a polyhaloethyl group as previously defined, $R^1$ is alkyl, phenyl, substituted phenyl, and dialkylamino, and $R^2$ is hydrogen, alkyl, phenyl and substituted phenyl. $R^1$ and $R^2$ are preferably not more than 6 carbons and vary from 1 to 6 carbons.

The acidic nitrogen portion of the molecule can be further broken down into bicyclic compounds having the basic structure 2-aza-[4,0,4]-bicyclonona-1,3-dione; hydantoins; and cyclic imides having from 5 to 6 annular members.

The bicyclic compounds or mononuclear carbocyclic dicarboximides have the following formula:

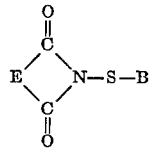

wherein B is as defined previously and E is a cycloalkylene or alkenylene radical of from 3 to 8 carbons and having from 0 to 3 sites of unsaturation (3 sites of olefinic unsaturation in the 6-membered ring signify the phenylene radical).

The preferred compounds are those in which the ring is aliphatically saturated or has 1 site of olefinic unsaturation, i.e., 0 to 1 sites of olefinic unsaturation. By describing the unsaturation as olefinic, it is intended to include aromatic unsaturation, so that benzene is included in the above description,. Excluding the aromatic ring for the moment, the compounds having 0 to 1 olefinic unsaturation have the following formula:

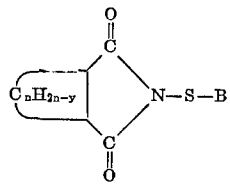

wherein B is as defined previously, $n$ is an integer of from 1 to 6 and $y$ is 0 when the ring is saturated and 2 when the ring has 1 site of olefinic unsaturation.

Illustrative of compounds included among the mononuclear carbocyclic dicarboximides are cyclopropane, 1,2-dicarboximide, cyclobutane 1,2-dicarboximide, cyclopentane 1,2-dicarboximide, 1,3-cyclopentadiene-1,2-dicarboximide, cyclooctane 1,2-dicarboximide, 3-cyclobutene-1,2-dicarboximide, cycloheptane 1,2-dicarboximide, 1,3,5-cycloheptatriene-1,2-dicarboximide, etc. (The 6-membered rings will be discussed below.)

The particularly preferred bicyclic compounds or mononuclear carbocyclic dicarboximides are when the carbocyclic ring is a hexacyclic or 1,2-cyclohexylene ring having the following formula:

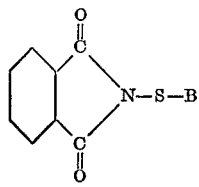

wherein B is as defined previously and the cyclohexylene ring has from 0 to 3 sites of olefinic unsaturation, i.e., 1,2-phenylene, 1,2-dihydrophenylene, 1,2-tetrahydrophenylene, and hexahydrophenylene (cyclohexylene), that is phenylene and hydro-derivatives thereof. The molecule can also be considered as phthalimide and derivatives thereof and would therefore be phthalimide, dihydrophthalimide, tetrahydrophthalimide and hexahydrophthalimide. The phthalimide molecule may be substituted or unsubstituted, mono-nitro substituents (mono-nitrophenylene) being preferred.

The dihydro derivative, that is cyclohexadiene, can be 1,3-, 1,4-, 2,4-, 3,5-, etc. The tetrahydro derivative can be the 1-, 2-, 3- or 4-. Preferred compounds are the phthalimide and tetrahydrophthalimides, particularly the $\Delta^4$-tetrahydrophthalimides.

The hydantoin compounds have the following formula:

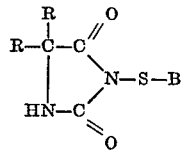

wherein B is as defined previously and the R's may be the same or different and are hydrogen or alkyl, preferably lower alkyl. Included among the lower alkyl groups are methyl, ethyl, propyl, butyl, amyl, etc.

The compounds are 3-polyhaloethylthiohydantoin, 3-polyhaloethylthio-5-alkylhydantoin, and 3-polyhaloethylthio - 5,5 - dialkylhydantoin, wherein the polyhaloalkyl group is as defined previously. Preferred compounds are 3-polyhaloethylhydantoin and its derivatives substituted in the 5-position with 1 or 2 lower alkyl groups.

The mono-cyclic imides prepared from $\alpha,\omega$-dicarboxylic acids have the following generic formula:

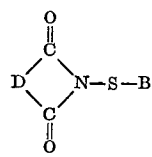

wherein B is as defined previously and D is either $(CH_2)_n$, wherein $n$ varies from 2 to 3, i.e., dimethylene and trimethylene, —CH=CH— (ethylenylene) or

—CH$_2$OCH$_2$—

(bis-methyleneoxy). The $\alpha,\omega$-dibasic acids from which the imides are derived are succinic, glutaric, maleic, and diglycolic.

The sulfonamides have the following formula:

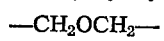
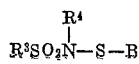

wherein $R^3$ is a phenyl group, a substituted phenyl group, such as a halophenyl group, a dialkylamino group (N,N-dialkylsulfamoyl) and an alkyl group, and $R^4$ can be hydrogen, lower alkyl, phenyl or substituted phenyl such as halophenyl, e.g., chlorophenyl, bromophenyl, etc. The sulfonamide (or N-substituted sulfonamide) may be benzene sulfonamide, substituted benzenesulfonamides, alkane sulfonamides, sulfamides, etc. Preferred compounds are prepared from benzene sulfonamide, halobenzene sulfonamide, such as 4-chloro or 4-bromobenzene sulfonamide, i.e., halogens of atomic number 17 to 35, lower dialkylamino sulfonamides (N,N-di-lower alkyl sulfamides) and lower alkane sulfonamides. Lower alkyl groups include methyl, ethyl, propyl, butyl, hexyl, etc.

As already indicated, the polyhaloethylthio group has the following formula:

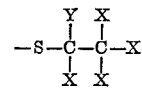

where Y must be chlorine or bromine, i.e., halogen of atomic number 17 to 35, and the X's may be hydrogen or chlorine or bromine with the proviso that at least two of the X's must be halogen. The preferred polyhaloethyl radicals are the 1,1,2,2-tetrahaloethyl, 1,2,2,2-tetrahaloethyl and -pentahaloethyl radicals, particularly when the halogen is chlorine.

Preferred polyhaloethylthio groups have the following formula:

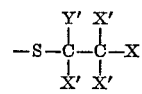

wherein X and Y' are hydrogen, chlorine or bromine, and X' is halogen of atomic number 17 to 35, that is, those haloethyl groups having 4 to 5 halogens.

These unique compounds are produced by using specific variations on a generalized method of preparation. Fundamentally, the preparation of a particular polyhaloethyl substituted imide or amide of the invention is accomplished by the reaction of an alkali metal salt of the corresponding imide or amide with the corresponding polyhaloethylsulfenyl halide. The imide or amide may be contained in a suitable inert medium, such as an aromatic solvent, e.g., benzene, toluene, etc., an alcohol, e.g., methanol, ethanol, etc., or water. Furthermore, the imide or amide may be used directly in the form of its alkali metal salt or the salt may be formed in situ. Where an aromatic solvent is used, it is preferred to employ the imide or amide in the form of its alkali metal salt; where water or alcohol is employed as the inert medium, is is preferred to form the salt in situ by including in the reaction mixture sufficient quantities of the alkali metal cation of the salt. This cation is employed in the form of an alkali metal alkoxide of the corresponding alcohol, where alcohol is the medium, or an alkali metal hydroxide where water is the medium.

The solution or suspension of the alkali metal salt of the imide or amide is vigorously stirred, preferably at low temperature, while the desired sulfenyl halide is added. The sulfenyl halide may be contained in a suitable inert solvent, such as petroleum ether or mixed hexanes, if desired. After a sufficient reaction period, the product is isolated by filtration or by removing the solvent by distillation. The product then may, if desired, be recrystallized from a suitable solvent, such as methanol or aromatic solvent.

The particular polyhaloethylsulfenyl halide chosen depends on the specific number, kind, and/or arrangement of the halogens desired on the N-polyhaloethylthio radical of the product. By employing a sulfenyl halide having a bromine substituent on the ethyl group, bromine-containing compounds, such as N-(2-bromo-1,2-dichloroethylthio) imides or amides, within the scope of the invention, are prepared.

It is also possible to first prepare an N-polyhaloethylthio imide or amide which lacks 1 or 2 chlorine atoms adjacent to the sulfur atom. This product, then, may be directly chlorinated at elevated temperatures, in the presence of a suitable catalyst, e.g., sulfuric or chlorosulfonic acid, to obtain the desired N-polyhaloethylthio imide or amide.

As illustrations of the various in specific compositions of the class of compounds of the invention an adaptability of the aforementioned method of preparation, the following examples are presented. It is to be understood that the compounds prepared are merely representative of the many compounds falling within the scope of N-polyhaloethylthio imides and amides and are not to be construed as limitations on the scope of the invention.

A representative example is reported in detail and followed by a table disclosing a number of compounds and their properties which were prepared in a similar manner to the detailed example.

Example 1

A mixture of 9.0 g. cis-$\Delta^4$-tetrahydrophthalimide and 200 ml. ice water was vigorously stirred while 4.8 g. of 50 percent sodium hydroxide were added. Then 14.0 g. of 1,2,2,2-tetrachloroethylsulfenyl chloride were added and the agitation continued for about 5 minutes. The crude product was removed by filtration, recrystallized from methanol, and analyzed to be N-(1,2,2,2-tetrachloroethyl-cis-$\Delta^4$-cyclohexene-1,2-dicarboximide.

Other representative compounds were similarly prepared, and their analyses, along with the above compound, appear in Table I.

TABLE I

| Compound | Melting Point (° C.) | Analysis (percent) | | |
|---|---|---|---|---|
| | | Elem. | Theory | Found |
| N-(1,2,2,2-tetrachloroethylthio)-cis-$\Delta^4$-cyclohexene-1,2-dicarboximide. | 102–106 | Cl | 40.6 | 40.7 |
| N-(1,1,2,2-tetrachloroethylthio)-phthalimide. | 116–117 | Cl | 41.1 | 40.8 |
| | | S | 9.18 | 9.20 |
| | | N | 4.0 | 4.20 |
| 3-nitro-N-(1,2,2,2-tetrachloroethylthio)-phthalimide. | 118–119.5 | Cl | 36.4 | 36.2 |
| 4-nitro-N-(1,2,2,2-tetrachloroethylthio)-phthalimide. | 132–133 | Cl | 36.4 | 35.0 |
| N-(pentachloroethylthio)-cis-$\Delta^4$-cyclohexene-1,2-dicarboximide. | 159–163 | Cl | 46.3 | 45.8 |
| | | S | 8.4 | 8.6 |
| N-(2-bromo-1,2,2-trichloroethylthio)-cis-$\Delta^4$-cyclohexene-1,2-dicarboximide. | 160–161 | Cl | 27.0 | 27.1 |
| | | Br | 20.4 | 20.2 |
| N-(1,1,2-trichloroethylthio)-cis-$\Delta^4$-cyclohexene-1,2-dicarboximide. | 88–89 | Cl | 33.8 | 34.0 |
| N-(1,1,2,2-tetrachloroethylthio)-cyclohexane-1,2-dicarboximide. | 143–144 | Cl | 40.4 | 37.3 |
| | | S | 9.1 | 8.6 |
| N-(1,1,2,2-tetrachloroethylthio)-$\Delta^4$-cyclohexene-1,2-dicarboximide. | 93–95 | Cl | 40.6 | 36.8 |
| | | S | 9.1 | 8.4 |
| N-(1,1,2,2-tetrachloroethylthio)-4,5-dibromocyclohexane-1,2-dicarboximide. | 144–146.5 | Br | 31.4 | 31.7 |
| N-(1,1,2,2-tetrachloroethylthio)-1,2-cyclopropane dicarboximide. | 108–9 | Cl | 46.0 | 43.0 |
| | | S | 10.35 | 10.95 |
| | | N | 4.53 | 4.28 |
| N-(1,1,2,2-tetrachloroethylthio)-1,2-cyclobutane dicarboximide. | 137–138.5 / 137–138.5 | Cl | 44.0 | 42.8 |
| | | S | 9.91 | 10.22 |
| | | N | 4.54 | 4.62 |

Example 2

To a mixture of 6.8 g. potassium phthalimide and 50 ml. benzene, 7.3 g. 1,2,2-trichloroethylsulfenyl chloride were added. A slurry was formed which was heated to 50° C. for 2½ hours, cooled, filtered, and stripped under reduced pressure to remove solvent. The crude solid obtained was recrystallized from methanol and analyzed to be N-(1,2,2-trichloroethylthio)-phthalimide.

Other compounds of the invention were prepared analogously to the above compound. The analyses of representative compounds prepared in this manner are shown in Table II.

TABLE II

| Compound | Melting Point (° C.) | Analysis (percent) | | |
|---|---|---|---|---|
| | | Elem. | Theory | Found |
| N-(1,2,2-trichloroethylthio)-phthalimide. | 110–113 | Cl | 34.5 | 34.2 |
| N-(1,2,2,2-tetrachloroethylthio)-phthalimide. | 148–152 | Cl | 41.2 | 43.6 |
| N-(2-chloro-1,2-dibromoethylthio)-phthalimide. | 103–105 | (*) | 7.5 | 8.6 |

*Total M. equiv. halogen—Total number of milliequivalents halogen present was ascertained.

Example 3

A mixture of 173 g. N-(1,2,2,2 - tetrachloroethylthio)-phthalimide prepared as in Example 2, 50 ml. carbon tetrachloride, 7 g. 98 percent sulfuric acid, and 5 g. triethyl phosphate was heated to about 70° C. and 71 g. of chlorine were added while stirring vigorously. The mixture was then cooled, filtered, and the solid obtained recrystallized from methanol. It was found to melt at 180–189° C. and was analyzed to be N-(pentachloroethylthio)-phthalimide.

Percent chlorine:
 Theory _____ 46.8
 Found _____ 44.5
Percent nitrogen:
 Theory _____ 3.7
 Found _____ 3.9

Example 4

A mixture of 5.4 g. sodium methoxide, 60 ml. of methanol, 12.8 g. of cis-$\Delta^4$-tetrahydrophthalimide, and 60 ml. of methanol was agitated while 20.0 g. of 1,1,2,2-tetrachloroethylsulfenyl chloride were added, causing a solid to separate. The solid was filtered, water-washed, recrystallized from methanol, and analyzed to be N-(1,1,2,2-tetrachloroethylthio)-cis-$\Delta^4$-cyclohexene-1,2-dicarboximide.

The analyses of this and another analogously prepared compound of the invention are shown in Table III.

TABLE III

| Compound | Melting Point (° C.) | Analysis (percent) | | |
|---|---|---|---|---|
| | | Elem. | Theory | Found |
| N-(1,1,2,2-tetrachloroethylthio)-cis-$\Delta^4$-cyclohexene-1,2-dicarboximide. | 154–155.5 | Cl | 40.7 | 40.4 |
| | | S | 9.2 | 9.08 |
| | | N | 4.0 | 4.19 |
| N-(1,2,2-trichloroethylthio)-cis-$\Delta^4$-cyclohexene-1,2-dicarboximide. | 96–100 | Cl | 33.8 | 34.8 |
| | | N | 4.4 | 4.5 |

Example 5

A mixture of 16.0 g. of a 50% sodium hydroxide solution and 184 g. ice and water was vigorously stirred while 25.6 g. of 5,5-dimethylhydantoin were added at 0° C. Then 47.0 g. of 1,2,2,2-tetrachloroethylsulfenyl chloride were added rapidly and the agitation continued for about 3–4 minutes. The crude product which formed was removed by filtration, dried, recrystallized from hot methanol, and analyzed to be 3-(1,2,2,2-tetrachloroethylthio)-5,5-dimethylhydantoin.

Other representative compounds were similarly prepared, and their analyses, along with the above compound, appear in Table IV.

TABLE IV

| Compound | Melting Point (° C.) | Analysis (percent) | | |
|---|---|---|---|---|
| | | Elem. | Theory | Found |
| 3-(1,2,2,2-tetrachloroethylthio)-5,5-dimethylhydantoin. | 161-164 | Cl | 43.5 | 43.4 |
| 3-(1,1,2-trichloroethylthio)hydantoin. | 145-148 | Cl | 40.4 | 39.0 |
| | | S | 12.1 | 11.7 |
| 3-(1,1,2,2-tetrachloroethylthio)-5,5-dimethylhydantoin. | 196-199 | Cl | 43.5 | 43.0 |
| 3-(2-chloro-1,2,2-tribromoethylthio)-5,5-dimethylhydantoin. | 187-189 | Cl | 7.7 | 8.1 |
| | | Br | 52.2 | 52.1 |
| 3-(1,1,2,2-tetrachloroethylthio)hydantoin. | 158-160 | Cl | 47.7 | 47.8 |
| | | S | 10.8 | 11.6 |
| 3-(2-bromo-1,1,2-trichloroethylthio)hydantoin. | 157-158 | Cl | 31.1 | 33.2 |
| 3-(pentachloroethylthio)-5,5-dimethylhydantoin. | 183-187 | Cl | 49.2 | 49.3 |
| 3-(1,1,2,2-tetrachloroethylthio)-5-(1-ethylamyl)hydantoin. | 112-114 | Cl | 35.9 | 32.7 |
| | | S | 8.1 | 7.5 |
| 3-(2-bromo-1,1,2-trichloroethylthio)-5,5-dimethylhydantoin. | 190 | (*) | .0108 | .0111 |

Total M. equiv. halogen—Total number of milliequivalents halogen present was ascertained.

Example 6

A mixture of 5.0 g. of solid sodium hydroxide, 50 ml. water, and about 150 g. ice was vigorously stirred while 28.2 g. of N-(4-chlorophenyl)ethanesulfonamide were added at 9° C. Then 47.0 g. of 1,1,2,2-tetrachloroethylsulfenyl chloride were added rapidly and the agitation continued for about 3–4 minutes. The crude product which formed was removed by filtration, dried, recrystallized from acetone, and analyzed to be N-(4-chlorophenyl)-N-(1,1,2,2-tetrachloroethylthio)ethanesulfonamide.

Other representative compounds were similarly prepared, and their analyses, along with the above compound, appear in Table V.

TABLE V

| Compound | Melting Point (° C.) | Analysis (percent) | | |
|---|---|---|---|---|
| | | Elem. | Theory | Found |
| N-4-chlorophenyl-N-(1,1,2,2-tetrachloroethylthio)ethanesulfonamide. | 126-128 | S | 15.3 | 15.3 |
| N-methyl-N-(1,2,2-trichlorovinylthio)-4-chlorobenzenesulfonamide. | 98-100 | Cl | 38.6 | 38.2 |
| N-phenyl-N-(1,2,2-trichlorovinylthio)dimethylaminosulfonamide. | 87-88 | Cl | 29.5 | 31.0 |
| | | N | 7.7 | 8.0 |
| N-ethyl-N-(1,2,2,2-tetrachloroethylthio)benzenesulfonamide. | 72-75 | Cl | 37.0 | 37.0 |
| N-methyl-N-(1,2,2,2-tetrachloroethylthio)-4-chlorobenzenesulfonamide. | 103-105 | Cl | 44.1 | 42.3 |
| N-phenyl-N-(1,2,2,2-tetrachloroethylthio)dimethylaminosulfonamide. | 92-96 | Cl | 35.6 | 35.0 |
| N-methyl-N-(1,1,2,2-tetrachloroethylthio-4-chlorobenzenesulfonamide. | 120-122 | Cl | 44.1 | 42.7 |
| N-(2-bromo-1,1,2-trichloroethylthio)-N-methyl-4-chlorobenzenesulfonamide. | 118-122 | Cl | 31.7 | 31.9 |
| | | Br | 17.8 | 17.5 |
| N-(1,2-dibromo-1,2-dichloroethylthio)-N-methyl-4-chlorobenzenesulfonamide. | 119-121 | Cl | 27.1 | 25.0 |
| | | Br | 32.4 | 30.1 |
| N-methyl-N-pentachloroethylthio-4-chlorobenzenesulfonamide. | 71-75 | Cl | 47.5 | 47.8 |
| | | S | 14.3 | 14.8 |

Example 7

A mixture of 6.65 g. succinimide and 125 ml. ice water was vigorously stirred while 5.4 g. of 50% sodium hydroxide were added. Then 15.7 g. of 1,1,2,2-tetrachloroethylsulfenyl chloride in 50 ml. mixed hexanes were added and the agitation continued for about 5 minutes. The crude product was removed by filtration, washed with water and mixed hexanes, air-dried, and analyzed to be N-(1,1,2,2-tetrachloroethylthio)succinimide.

Other representative compounds were similarly prepared, and their analyses, along with the above compound, appear in Table VI.

TABLE VI

| Compound | Melting Point (° C.) | Analysis (percent) | | |
|---|---|---|---|---|
| | | Elem. | Theory | Found |
| N-(1,1,2,2-tetrachloroethylthio)succinimide. | 85-87 | Cl | 47.5 | 47.1 |
| N-(1,2,2-trichloroethylthio)succinimide. | 124-125 | Cl | 40.6 | 40.0 |
| N-(1,1,2-trichloroethylthio)succinimide. | 113-115 | Cl | 40.6 | 40.0 |
| N-(1,2,2,2-tetrachloroethylthio)succinimide. | 131-132 | Cl | 47.5 | 47.3 |
| N-(pentachloroethylthio)succinimide. | 123-125 | Cl | 53.6 | 51.5 |
| N-(1,1,2,2-tetrachloroethylthio)diglycolimide. | 81-85 | Cl | 45.4 | 45.4 |
| N-(1,1,2,2-tetrachloroethylthio)glutarimide. | 78-81 | N | 4.51 | 4.73 |
| | | S | 10.3 | 9.7 |
| N-(1,1,2,2-tetrachloroethylthio)maleimide. | 65-68 | S | 10.9 | 11.3 |
| | | N | 4.8 | 4.9 |

The principal utility of the compounds of this invention has been shown by their great superiority over the prior art analogous compounds in a variety of biological applications. They have been particularly superior in their control of numerous fungus-caused plant diseases. Comparisons of the novel compounds of this invention and their prior art analogs are shown by the following tests.

The effectiveness against spores was determined by means of "The Standard Spore Slide-Germination Method For Determining Fungicidal Activity," described in the American Phytopathological Society Journal, vol. 33, pages 627–632, 1943. The method is designed to measure the fungitoxic activity of fungicidal chemicals, their activity being expressed in terms of percent inhibition of germination of fungus spores.

Each compound to be tested was dissolved in acetone at a specified dilution. These solutions were then pipetted into the wells of depression slides and allowed to dry. The wells were filled with a spore suspension of the test organism, *Monilinia fructicola*, and incubated in a moist chamber overnight. A group of 100 spores was examined and the number of spores germinated and not germinated was counted and recorded to show the biological activity in terms of the percentage germination inhibition.

The following table reports the results obtained using a variety of acidic organo nitrogen groups with a variety of polyhaloethyl groups within the scope of this invention. Also included for comparison are the results with captan, N-trichloromethylthio $\Delta^4$-tetrahydrophthalimide, a prior art compound, which has found commercial acceptance as an excellent fungicide.

| Acidic Nitrogen Moiety [1] | Polyhaloalkyl Moiety | *Monilinia fructicola* (spores) | | | |
|---|---|---|---|---|---|
| | | 10 p.p.m. | 1.0 p.p.m. | 0.5 p.p.m. | 0.25 p.p.m. |
| THP | CCl$_3$ | | 99 | 71 | 4 |
| THP | CHClCHCl$_2$ | | 100 | | |
| THP | CHClCCl$_3$ | | 100 | | |
| THP | CCl$_2$CCl$_2$H | | 100 | 100 | 94 |
| THP | CClBrCClBrH | | 100 | 97 | 57 |
| THP | CCl$_2$CCl$_3$ | | 100 | 99 | 54 |
| C | CCl$_2$CHCl$_2$ | | 100 | 100 | 100 |
| S | CCl$_2$CCl$_2$H | 100 | | | |
| M | CCl$_2$CCl$_2$H | 100 | | | |
| G | CCl$_2$CCl$_2$H | 96 | | | |
| BS-E | CHClCCl$_2$H | 100 | | | |
| BS-E | CCl$_2$CCl$_2$H | 100 | | | |
| 4-CBS-M | CCl$_2$CCl$_2$H | 100 | | | |
| 4-CBS-M | CBrClCBrClH | 100 | | | |
| 4-CBS-M | CCl$_2$CCl$_3$ | 70 | | | |
| CPD | CCl$_2$CCl$_2$H | 100 | | | |
| CBD | CCl$_2$CCl$_2$H | 100 | | | |

[1] See the following:
 THP—$\Delta^4$-tetrahydrophthalimide.
 C—cyclohexane-1,2-dicarboximide.
 S—succinimide.
 M—maleimide.
 G—glycolimide.
 BS-E—N-ethyl benzenesulfonamide.
 4-CBS-M—N-methyl 4-chlorobenzenesulfonamide.
 CPD—Cyclopropane-1,2-dicarboximide.
 CBD—Cyclobutane-1,2-dicarboximide.

A number of compounds were also tested by means of the mycelial drop test. This test is designed to measure the fungitoxic activity of fungicidal chemicals in terms of their degree of inhibition upon mycelial growth. Each fungitoxic compound to be tested was dissolved in acetone in dilutions as indicated in the following table. Paper discs previously inoculated by impregnation with equal amounts of particular fungus mycelium and placed on potato dextrose agar medium were treated by applying a precise and equal volume of each of these fungicidal solutions to their center. Following treatment with the fungitoxic chemical, the discs were incubated along with inoculated but untreated control discs at ambient temperatures until such time that these untreated control discs were filled with mycelial growth. Activity of the fungitoxic chemical tested was determined by comparative measurements of radii of mycelial growth away from the edge of the disc in treated and untreated samples. From this comparison a percent inhibition of growth area can be determined. The results of this test for various fungitoxic chemicals on the particular fungus mycelium are indicated in the following table.

room with ambient temperatures in the range of about 72–80° F. and relative humidity of about 70–80% for 14 days. At the end of the incubation period, disease readings were made by counting the number of disease pustules on the three oldest stalks. These counts were compared with a similarly treated but unsprayed control series to determine the percentage of fungus control effected by the fungitoxic chemicals.

In the test for control of powdery mildew of cucumbers, three replicate National Pickling cucumber plants growing in a standard University of California soil mix, in the 3-leaf stage, were sprayed at 20 p.s.i. with the fungitoxic chemical to be tested in an aqueous suspension of 400 p.p.m. These suspensions were made uniform by means of an inert wetting agent and suitable filler. The plants were dried at ambient greenhouse temperature and then inoculated with a spray of an aqueous suspension of approximately 50,000 spores per ml. of *Erysiphe cichroacearum*, the fungus causing powdery mildew of cucumbers. The plants were immediately incubated for about 10 days in a moist room having a daytime temperature of about 75° F., a nighttime temperature of about 68° F. and an

| Compound | | Fungus (Mycelium) | | | | | | | | |
|---|---|---|---|---|---|---|---|---|---|---|
| | | Verticillium | Rhizoctonia | | Fusarium | | Helminthosporium | | | Pythium |
| Acidic Nitrogen Moiety [1] | Polyhaloethyl Moiety | 500 p.p.m. | 250 p.p.m. | 125 p.p.m. | 1,000 p.p.m. | 500 p.p.m. | 1,000 p.p.m. | 500 p.p.m. | 125 p.p.m. | 500 p.p.m. |
| THP | CCl$_3$ | 32 | 66 | | 23 | | | | 16 | 76 |
| THP | CCl$_2$CCl$_2$H | 86 | 97 | | 69 | | | | 100 | 100 |
| THP | CBrClCBrClH | 100 | 100 | | 80 | | | | 56 | 95 |
| DBC | CCl$_2$CCl$_2$H | 60 | | | 68 | | | | | 100 |
| C | CCl$_2$Cl$_2$H | 100 | 96 | | 100 | | | | 100 | 100 |
| THP' | CCl$_2$Cl$_2$H | 95 | 98 | | 72 | | | | 66 | 85 |
| DMH | CCl$_3$ | | 35 | | 40 | | 94 | 78 | | |
| DMH | CCl$_2$CH$_2$Cl | | | | | | 100 | | | |
| DMH | CCl$_2$CCl$_2$H | | 100 | | 100 | | 100 | 100 | | |
| DMH | CCl$_2$CCl$_3$ | | 98 | | 55 | | 100 | 95 | | |
| DMH | CBrClCBrClH | | 100 | | 100 | | | 100 | | |
| H | CCl$_2$CCl$_2$H | | | | | | 100 | | | |
| EAH | CCl$_2$CCl$_2$H | | | | | | 100 | | | |
| CPD | CCl$_2$CCl$_2$H | 100 | 100 | 100 | 100 | | | | | 100 |
| CBD | CCl$_2$CCl$_2$H | 100 | 100 | | 98 | | | | | 100 |

| Compound | | Fungus (Mycelium) | | | | | | | | | | |
|---|---|---|---|---|---|---|---|---|---|---|---|---|
| | | Verticillium | | | | Rhizoctonia | | | | Helminthosporium | | | |
| Acidic Nitrogen Moiety [1] | Polyhaloethyl Moiety | 1,000 p.p.m. | 500 p.p.m. | 250 p.p.m. | 125 p.p.m. | 1,000 p.p.m. | 500 p.p.m. | 250 p.p.m. | 125 p.p.m. | 1,000 p.p.m. | 500 p.p.m. | 250 p.p.m. | 125 p.p.m. |
| S | CCl$_3$ | 100 | 99 | 42 | 24 | 100 | 100 | 57 | 13 | 100 | 57 | 46 | 27 |
| S | CHClCCl$_2$H | 100 | | | | 100 | | | | 100 | | | |
| S | CCl$_2$CCl$_2$H | 100 | 100 | 100 | 100 | 100 | 100 | 100 | 100 | 100 | 100 | 100 | 100 |
| S | CCl$_2$CCl$_3$ | 100 | | | | 100 | | | | 100 | | | |
| DG | CCl$_2$CCl$_2$H | 100 | | | | 99 | | | | 100 | | | |
| 4-CBS-M | CCl$_3$ | | | | | 21 | | | | | | | |
| 4-CBS-M | CCl$_2$CCl$_2$H | | | | | 99 | | | | | | | |
| 4-CBS-M | CBrClCBrClH | | | | | 96 | | | | | | | |
| 4-CBS-M | CCl$_2$CCl$_3$ | | | | | 94 | | | | | | | |
| DMAS-P | CCl$_2$CCl$_2$H | | | | | 100 | | | | | | | |
| ES-4CP | CCl$_2$CCl$_2$H | | | | | 100 | | | | | | | |

[1] See the following:
THP—Δ⁴-tetrahydrophthalimide.
DBC—4,5-dibromocyclohexane-1,2-dicarboximide.
C—cyclohexane-1,2-dicarboximide.
THP'—Δ'-tetrahydrophthalimide.
DMH—5,5-dimethylhydantoin.
H—hydantoin.
EACH—5-(1-ethylamyl)hydantoin.

S—succinimide.
DG—diglycolimide.
4-CBS-M—N-methyl 4-chlorobenzensulfonamide.
DMAS-P—N-phenyl dimethylaminosulfonamide.
ES-4CP—N-(4-chlorophenyl)ethanesulfonamide.
CPD—Cyclopropane-1,2-dicarboximide.
CBD—Cyclobutane-1,2-dicarboximide.

A few of the compounds were also tested for fungus activity in vivo. Comparison was made with prior art compounds which are analogs of applicant's novel compounds.

In the test concerned with celery late blight, four replicate young Utah celery plants growing in a standard U.C. soil mix, each having five stalks, 4–5″ in length, were sprayed at 15 p.s.i., with the fungitoxic chemical to be tested in an aqueous suspension of 40 p.p.m. The suspensions were made uniform by means of an inert wetting agent and suitable filler. The plants were dried at ambient greenhouse temperatures and then inoculated with a spray of an aqueous suspension of approximately 25,000 spores per ml. of *Septoria apiigraveolentis*, the fungus causing celery late blight. The plants were immediately incubated in a moist room for 24 hours at 65–70° F. and 100% relative humidity, after which they were removed to a average humidity of about 60–80%. At the end of this time, disease readings were made by counting the number of local lesions in the primary leaves of each plant. These counts were compared with a similarly inoculated but unsprayed control series to determine the percentage of fungus control effected by the fungitoxic chemical.

Compounds were also tested for the control of bean rust. In this test, three replicate Pinto bean plants growing in a standard University of California soil mix, in the 3-triplicate state and approximately 5″ tall were sprayed at 15 p.s.i. with each of the compounds to be tested in the dilution of 40 parts p.p.m. These suspensions were made uniform by means of an inert wetting agent and suitable filler. The plants were dried at ambient greenhouse temperatures and then inoculated with a spray of approximately 30,000 urediospores per ml. of *Uromyces*

*phaseoli typica*, the fungus causing bean rust. The plants were immediately incubated in a moist room for 24 hours at 72–73° F. and a relative humidity of 95–97%, after which they were removed to a room with ambient temperatures in the range of about 75–78° F. and a relative humidity of 85–90% for about 12 days. At the end of this incubation period, disease readings were made by counting the local lesions on the primary leaves. These counts were compared with a similarly inoculated but unsprayed control series to determine the percentage of fungus control effected by the fungitoxic chemical. The results appear in the following table:

| Compound | | Fungus (in vivo) | | |
|---|---|---|---|---|
| Acidic Nitrogen Moiety [1] | Polyhalo-alkyl Group | *S. apii* 40 p.p.m. | *E. cichoracearum* 400 p.p.m. | *U. phaseoli typica* 40 p.p.m. |
| THP | CCl₃ | | | 78 |
| THP | CCl₂CCl₂H | 87 | | |
| P | CCl₃ | 47 | 13 | 83 |
| P | CHClCCl₃ | | 47 | |

[1] See the following:
THP—Δ⁴-tetrahydrophthalimide.
P—phthalimide.

Comparison of activity was also made with the prior art compounds, those compounds having the N-trichloromethylthio group, which have already been shown to be inferior to the compounds of this invention, with compounds having polyhaloalkyl groups which are outside the scope of this invention, i.e., 1,1-dichloroethyl, 2,2,2-trichloroethyl and 1,2-dichloropropyl. In each case the same organo acidic imide or amide was used and the polyhaloalkyl group varied. The following table compares the activity reported as percent inhibition of the compounds toward a variety of organisms:

| Compound | | *Monilinia fructicola* (spores) | | Mycelium | | |
|---|---|---|---|---|---|---|
| Acidic Nitrogen Moiety [1] | Polyhaloalkyl Group | 10 p.p.m. | 1.0 p.p.m. | Helminthosporium 1,000 p.p.m. | Rhizoctonia 1,000 p.p.m. | Verticillium 1,000 p.p.m |
| THP | SCCl₃ | | 99 | | | |
| THP | SCCl₂CH₃ | | 0 | | | |
| THP | SCH₂CCl₃ | | 0 | | | |
| THP | SCHClCHClCH₃ | | 0 | | | |
| DMH | SCCl₃ | | | 94 | | |
| DMH | SCCl₂CH₃ | | | 2 | | |
| DMH | SCH₂CCl₃ | | | 0 | | |
| S | SCCl₃ | | | 100 | 100 | 100 |
| S | SCCl₂CH₃ | | | 2 | 18 | 0 |
| S | SCH₂CCl₃ | | | 9 | 37 | 2 |
| 4-CB-M | SCCl₃ | 99 | | | | |
| 4-CB-M | SCH₂CCl₃ | 37 | | | | |

[1] See the following:
THP—Δ⁴-tetrahydrophthalimide.
DMH—5,5-dimethylhydantoin.
S—succinimide.
4-CB-M—N-methyl 4-chlorobenzenesulfonamide.

Both captan and Phaltan, the N-trichloromethylthio Δ⁴-tetrahydrophthalimide and phthalimide, are known to be outstanding fungicides and are commercially available. The compounds of this invention are equal and in most cases better than the prior art analogs. It was entirely unexpected from screening of the prior art compounds and their homologs that the unique class of compounds of this invention would possess this marked superiority.

Aside from the specific formulation and application of the class of compounds of the invention as represented by the foregoing tests, these compounds may be dispersed in or upon other inert liquid and solid carriers, such as inert clay, xylenes, etc. The solid carriers may be in the form of a dust, or used in conjunction with a suitable wetting agent to form a wettable powder. The fungitoxic compounds of the invention may also be formulated with other solvents, dispersing agents, or emulsifying agents. Further, these compounds may not only be applied alone or in mixtures with other compounds of the disclosed class, but may also be used in combination with other active toxicants in the formulation of fungicidal compositions.

As an additional advantage of the compounds of this invention over their prior art analogs, e.g., captan and Phaltan, it has been found that the compounds of this invention may be formulated as an emulsive in aromatic and similar solvents, whereas the relatively low solubility of captan and other similar prior art analogs in these solvents essentially prohibits their use in such agriculturally valuable formulations.

Preferred formulations are prepared by combining one or more compounds of this invention with an inert filler, such as clays, diatomaceous earth, talc, etc., and appropriate wetting and dispersing agents. The dispersing agents include lignin sulfonates or synthetics that provide such dispersions; the wetting agents include alkylarylsulfonates and non-ionics formed by the condensation of ethylene oxide or sorbitan residues. Other conventional synthetics or natural anionic and non-ionic combinations well known to the art may also be used.

Preferred compositions are wettable powders having from 45 to 85% by weight of toxicant. The inert filler will vary from 10 to 40% by weight, in inverse ratio to the amount of toxicant. The other materials, such as dispersing agent, wetting agent, spray stickers, stabilizing agents, will usually be in the range of about 2% to 10% by weight.

The compounds may be applied to any environmental area which is a host to fungus or susceptible to fungus attack. For example, the fungicidal compositions may be sprayed or otherwise applied directly to a plant, may be applied to the plant seed, sprayed upon the soil or other plant environment, or used in similar ways so as to effect the control of fungus and fungus diseases.

I claim:
1. A fungicidal composition comprising a biologically inert carrier and a fungitoxic amount of an N-polyhaloethylthio compound selected from the group consisting of:

(I) 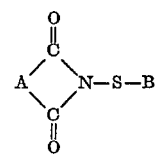

wherein A is selected from the group consisting of:
(1) 1,2-carbocyclic groups of from 3 to 8 annular carbons having 0 to 3 sites of olefinic unsaturation;
(2) R₂C—NH—, wherein R is selected from the group consisting of hydrogen and lower alkyl;
(3) (CH₂)n, wherein *n* varies from 2 to 3;
(4) —CH=CH—; and
(5) —CH₂OCH₂—; and (II) 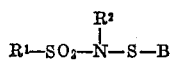

R¹—SO₂—N—S—B wherein R¹ is selected from the group consisting of lower alkyl, phenyl and di-lower-alkylamino, and R² is selected from the group consisting of hydrogen, lower alkyl and phenyl; and B is of the formula:

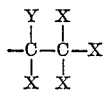

wherein Y is halogen of atomic number 17 to 35 and X is selected from the group consisting of hydrogen, and halogen of atomic number 17 to 35, with the proviso that at least 2 X's are halogen.

2. A fungicidal composition as a wettable powder which comprises from 45 to 85% by weight of at least one N-polyhaloethylthio compound as described in claim 1, from 10 to 40% by weight in inverse ratio to the amount of fungicidal compound of an inert filler, and from 2 to 10% by weight of members selected from the group consisting of dispersing agent, wetting agent, spray stickers and stabilizing agents.

3. A fungicidal composition comprising a biologically inert carrier and a fungitoxic amount of N-(1,1,2,2-tetrachloroethylthio)phthalimide.

4. A fungicidal composition comprising a biologically inert carrier and a fungitoxic amount of N-(1,1,2,2-tetrachloroethylthio)-Δ⁴-tetrahydrophthalimide.

5. A fungicidal composition comprising a biologically inert carrier and a fungitoxic amount of N-(1,1,2,2-tetrachloroethylthio) N-methyl-4-chloro-benzenesulfonamide.

6. A fungicidal composition comprising a biologically inert carrier and a fungitoxic amount of 3-(1,1,2,2-tetrachloroethylthio)-5,5-dimethylhydantoin.

7. A fungicidal composition comprising a biologically inert carrier and a fungitoxic amount of N-(1,1,2,2-tetrachloroethylthio)-cyclobutane-1,2-dicarboximide.

8. A method of preventing fungus damage to a plant host subject to fungus attack by said fungus comprising treating said host with a fungitoxic amount of an N-polyhaloethylthio compound selected from the group consisting of:

(I)

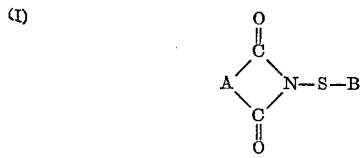

wherein A is selected from the group consisting of:
(1) 1,2-carbocyclic groups of from 3 to 8 annular carbons having 0 to 3 sites of olefinic unsaturation;
(2) R₂C—NH—, wherein R is selected from the group consisting of hydrogen and lower alkyl;
(3) (CH₂)n, wherein *n* varies from 2 to 3;
(4) —CH=CH—; and
(5) —CH₂OCH₂—; and (II)

wherein R¹ is selected from the group consisting of lower alkyl, phenyl and di-lower-alkylamino, and R² is selected from the group consisting of hydrogen, lower alkyl and phenyl; and B is of the formula:

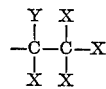

wherein Y is halogen of atomic number 17 to 35 and X is selected from the group consisting of hydrogen, and halogen of atomic number 17 to 35, with the proviso that at least 2 X's are halogen.

9. A method of preventing fungus damage to a plant host subject to fungus attack by said fungus comprising treating said host with a fungitoxic amount of N-(1,1,2,2-tetrachloroethylthio)phthalimide.

10. A method of preventing fungus damage to a plant host subject to fungus attack by said fungus comprising treating said host with a fungitoxic amount of N-(1,1,2,2-tetrachloroethylthio)-Δ⁴-tetrahydrophthalimide.

11. A method of preventing fungus damage to a plant host subject to fungus attack by said fungus comprising treating said host with a fungitoxic amount of N-(1,1,2,2-tetrachloroethylthio) N - methyl - 4 - chlorobenzenesulfonamide.

12. A method of preventing fungus damage to a plant host subject to fungus attack by said fungus comprising treating said host with a fungitoxic amount of 3-(1,1,2,2-tetrachloroethylthio)-5,5-dimethylhydantoin.

13. A method of preventing fungus damage to a plant host subject to fungus attack by said fungus comprising treating said host with a fungitoxic amount of N-(1,1,2,2-tetrachloroethylthio)-cyclobutane-1,2-dicarboximide.

14. A process for killing fungi comprising subjecting said fungi to a fungicidally effective amount of a compound having the formula

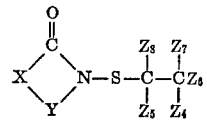

where Y is

where X is selected from the group consisting of —C₂H₄—, —C₃H₆—, —CH=CH—,

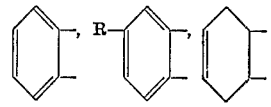

and

3 to 4 members of Z₄, Z₅, Z₆, Z₇ and Z₈ are halogen of atomic weight 35 to 80 and the remaining members of Z₄, Z₅, Z₆, Z₇ and Z₈ are hydrogen; and R is nitro.

15. A process of killing fungi comprising subjecting said fungi to a fungicidally effective amount of N-(trichloroethylthio) succinimide.

16. A process of killing fungi comprising subjecting said fungi to a fungicidally effective amount of N-(1,2,2-trichloroethylthio) succinimide.

17. A process of killing fungi comprising subjecting said fungi to a fungicidally effective amount of N-(trichloroethylthio) phthalimide.

18. A process of killing fungi comprising subjecting said fungi to a fungicidally effective amount of N-(1,2,2-trichloroethylthio) phthalimide.

19. A process of killing fungi comprising subjecting said fungi to a fungicidally effective amount of N-(trichloroethylthio)-cis-Δ⁴-tetrahydrophthalimide.

20. A process of killing fungi comprising subjecting said fungi to a fungicidally effective amount of N-(1,2,2-trichloroethylthio)-cis-Δ⁴-tetrahydrophthalimide.

References Cited

UNITED STATES PATENTS 3,154,468  10/1964  Aichenegg et al. _____ 167—33

ALBERT T. MEYERS, *Primary Examiner.*

J. D. GOLDBERG, *Assistant Examiner.*

U.S. Cl. X.R.

424—244, 248, 256, 258, 267, 274, 321